Fig. 2.

April 2, 1957 E. A. SAMMIS ET AL 2,787,760
AUTOMOTIVE ENGINE ANALYZER
Filed Dec. 19, 1952 6 Sheets-Sheet 4

INVENTORS
EDWARD A. SAMMIS
HARRY D. SMITH
EUGENE P. VEHSLAGE
BY
James P. Malone
ATTORNEY

Fig. 8.

United States Patent Office 2,787,760
Patented Apr. 2, 1957

2,787,760
AUTOMOTIVE ENGINE ANALYZER

Edward A. Sammis, Roslyn Heights, Harry D. Smith, New Hyde Park, and Eugene P. Vehslage, Great Neck, N. Y., assignors to Sperry Rand Corporation, a corporation of Delaware Application December 19, 1952, Serial No. 326,891

24 Claims. (Cl. 324—16)

This invention relates to ignition testing means for internal combustion engines, and more particularly, to automotive engine analyzers.

The principal operating conditions for good automotive engine performance are:
  (a) Proper air-fuel mixture.
  (b) Good combustion chamber compression.
  (c) Properly timed ignition which adequately fires the mixture.

Ignition troubles are not easily isolated, since they may occur from many different mechanical and electrical parts which are dynamically interrelated in a fairly complex manner. Therefore, the conventional cut-and-try method of removing, testing and replacing ignition parts one at a time is extremely wasteful of manpower. In conventional practice, many ignition parts, such as spark plugs, coils and distributors, are removed and bench tested. This removing of parts is very wasteful of manpower and does not provide the optimum dynamic testing with the part performing its normal function in an operative system. Furthermore, the conventional approach will not locate faults in parts not removed, intermittent faults, or faults occurring only under dynamic conditions. In conventional practice the separately removed parts are then statically tested by a number of separate nonrelated instruments which must be separately connected, interpreted and evaluated, and then reconsidered and evaluated again in terms of complete system performance. This system correlation and evaluation requires a high level of skill and experience by the mechanic. Quite often the cost of removing, testing and replacing ignition parts exceeds the cost of the parts themselves. Quite often good parts are scrapped because reliable and economic testing means are not available.

Therefore, there is a need for instrumentation which is integrated to provide complete and systematic dynamic testing of automotive ignition systems. Such apparatus will eliminate the manpower and material waste in aimless hit-or-miss testing, removing and replacing of parts, in separately testing the parts with separate instruments and then trying to evaluate the separate static test data in terms of dynamic system performance.

The present invention provides an automotive engine analyzer which fulfills this need. The present invention provides integrated measuring apparatus, which is easily connected and which may be used to dynamically test ignition system performance in a scientific and systematic manner.

More specifically, by using a distributor adapter and clipping two leads across the breaker points, it is possible with the present invention to fully check operation of the ignition system in the following respects:

A.  (1) Determine if all the spark plugs are firing properly.
    (2) Identify particular faults of a particular spark plug, i. e., shorted and open circuits, fouled and wide gapped plugs.
    (3) Determine whether or not breaker-point operation is good. (Free of arcing or bouncing.)
    (4) Check the breaker-point gap.
    (5) Measure the basic spark timing.
    (6) Determine whether respective spark advances are operating properly.
    (7) Measure the cam angle.
    (8) Determine relative "performance rating factor" of the ignition system.

B. Further information about calibration of the distributor and performance of the engine can be determined by making vacuum connections with rubber hoses from the invention to the distributor, carburetor, and manifold. By this means:
    (1) Vacuum advance may be separated from centrifugal advance. (Any desired vacuum may be applied to the distributor.)
    (2) Pressure developed at the carburetor may be verified over a range of engine speeds.
    (3) Manifold vacuum may be read.

C. By shorting spark plug leads to make the engine run on two cylinders:
    (1) Relative power outputs of respective pairs of cylinders can be determined by noting the speed and manifold pressures for each pair at the same throttle setting.
    (2) The engine may be "power-timed" at the approximate mid-range of the respective advances by rotating the distributor to obtain maximum speed at a given throttle setting. This is made possible by the unusual sensitivity of the tachometer of the present engine analyzer.

Accordingly, a principal object of the invention is to provide a new and improved automotive engine analyzer.

Another object of the invention is to provide an automotive engine analyzer for systematically and dynamically testing automotive ignition systems without affecting the operation thereof.

Another object of the invention is to provide new and improved engine analyzing means for testing an automotive engine without removing any parts.

Another object of the invention is to provide integrated instrumentation for dynamically testing automotive engines.

Another object of the invention is to provide new and improved means for dynamically checking spark plugs without removing them from the engine.

Another object of the invention is to provide new and improved means for checking an automotive ignition system under various speed and load conditions.

Another object of the invention is to provide new and improved means for checking automotive spark timing.

Another object of the invention is to provide means for checking the cam angle of the breaker points under various conditions of speed and load.

Another object of the invention is to provide new and improved means for checking the spark advance under various conditions of speed and load.

Another object of the invention is to provide means for measuring the distributor centrifugal spark advance under various conditions of speed and load.

Another object of the invention is to provide means for measuring the distributor vacuum advance under various conditions of speed and load.

Another object of the invention is to provide an engine analyzer having means for producing patterns illustrative of specific malfunctions.

Another object of the invention is to provide an engine analyzer comprising a cathode ray indicator, a sweep generator for the cathode ray indicator which is mechanically connected to the engine, in combination with an electronic tachometer, a timing light, and a timing pulse generator.

Another object of the invention is to provide an automotive engine analyzer comprising a cathode ray indicator for providing patterns illustrative of various engine faults in combination with a tachometer, a timing light, and a timing pulse generator for coordinating the action of the timing light and a cathode ray indicator.

Another object of the invention is to provide an automotive engine analyzer comprising a cathode ray indicator for providing patterns illustrative of various engine faults in combination with a tachometer, a timing light, and a timing pulse generator for coordinating the action of the timing light and a cathode ray indicator, in combination with means for measuring and controlling the vacuum pressure derived from the engine.

Another object of the invention is to provide new and improved adapter means for connecting the cathode ray indicator to the automotive engine distributor.

Another object of the invention is to provide an automotive engine analyzer comprising a sweep voltage generator and tachometer means connected to measure the slope of said sweep voltage to thereby indicate engine speed.

Another object of the invention is to provide an integrated instrumentation system for detecting ignition faults.

These and other objects of the invention will be apparent from the following specification and drawings, of which.

Figure 1:
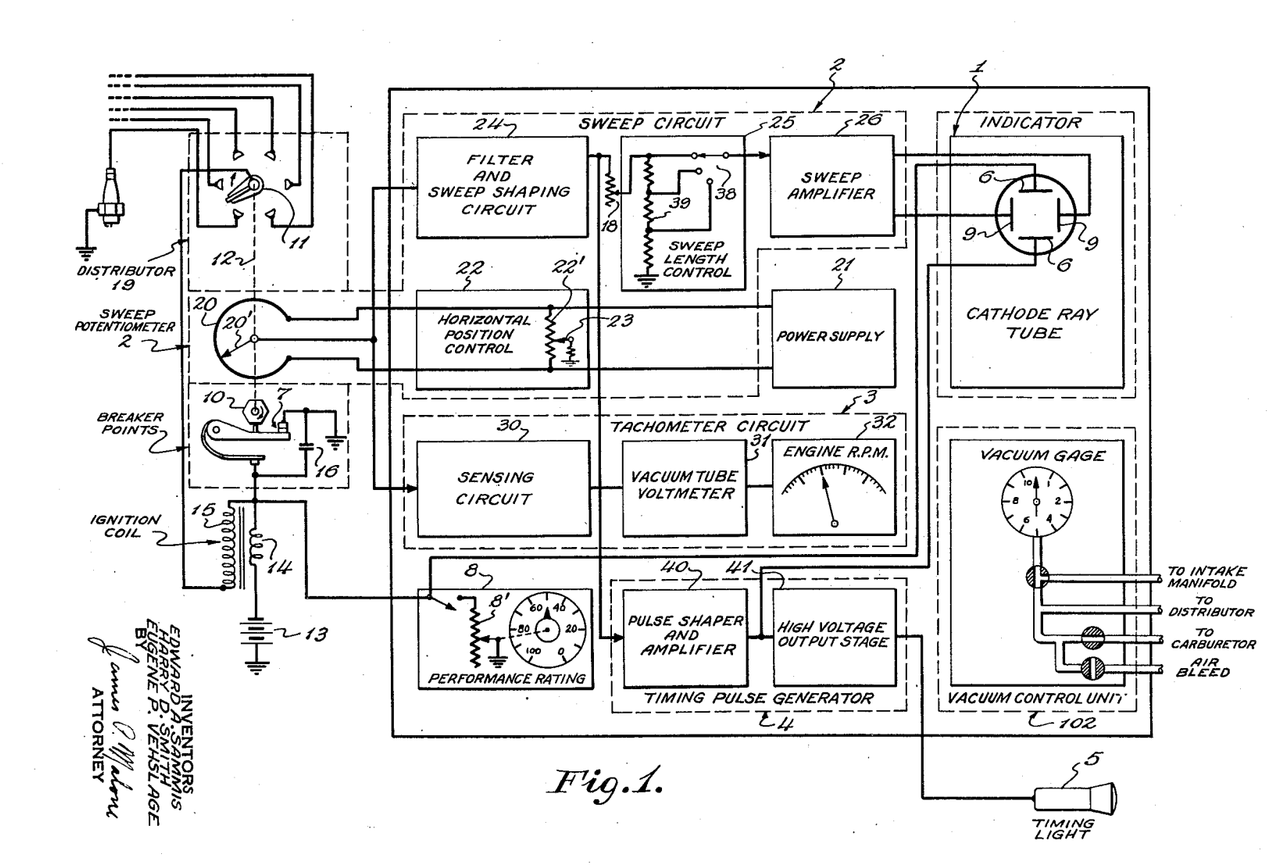
Fig. 1 is a block diagram of an embodiment of the invention.

Fig. 1 illustrates an embodiment of the invention which comprises generally a cathode ray indicator 1, a sweep circuit 2 connected to the engine under test to provide a sweep voltage of variable direct current (D. C.) level to the cathode ray indicator to select particular cylinders, a multi range tachometer circuit 3 connected to the sweep generator circuit to provide an accurate indication of the engine speed, a timing pulse generator 4 connected to the sweep circuit 2 and adapted to provide variable phase synchronous pulses to the cathode ray indicator 1 and the timing light 5. The timing light 5 may be a commercialy available timing light of the type as used in service stations for illuminating the indexed engine fly wheel in stroboscopic fashion. In conventional practice the timing light is connected to the number "one" spark plug and fires in synchronism therewith.

The vertical deflection plates 6 of the cathode ray indicator are coupled to the breaker points 7 of the automotive equipment under test. The performance rating means 8 comprises a variable resistance 8' connected across the points 7. The resistance 8' may be decreased thereby reducing the spark potential to determine the value at which speed drops off or one or more spark plugs stop firing, as will be more fully described hereafter. The potentiometer 8' is calibrated to provide an arbitrary figure of merit called the "performance rating."

Fig. 1 also shows several components of the automobile engine ignition system comprising the breaker points 7, previously mentioned, which are opened by the cam 10 of the distributor which is rotated in synchronism with the distributor rotor 11 by means of the engine driven distributor shaft 12. The automobile battery 13 is connected to the primary 14 of the ignition coil, the secondary 15 of which is connected to the distributor rotor 11, and the condenser 16 is connected across the distributor breaker points 7 in the conventional manner.

The automotive distributor 19 operates in an entirely conventional manner. The distributor shaft 12 is mechanically connected to the engine (not shown) and rotates with the engine at half engine speed thereby causing the cam 10 to open the points 7 to provide a spark to the distributor rotor 11. The distributor rotor 11 turns also, causing the spark to fire the respective spark plugs.

The sweep circuit 2 comprises several components which will now be discussed. The rotating potentiometer 20 is mechanically connected to the distributor shaft 12 by means of a distributor adapter, as will be more fully discussed in connection with Fig. 6. The rotating potentiometer is energized by a direct current (D. C.) power supply 21. The horizontal position control 22 is provided to vary the direct current (D. C.) level of the sawtooth sweep voltage obtained from the rotating potentiometer 20. It comprises a potentiometer 22' which is connected in parallel with the rotating potentiometer with its wiper arm 23 grounded through a resistor. The sawtooth sweep voltage is taken between the arm 20' of the rotating potentiometer 20 and the grounded arm 23 of the horizontal position control 22'. Therefore, as the position control arm 23 is moved, it will vary the direct current (D. C.) level of the sweep voltage which is applied to the filter and shaping circuit 24. This varies the timing of the sawtooth wave relative to the engine cycle.

The filter and shaping circuit 24 operates to smooth and shape the waveform, as will be more fully explained in connection with Fig. 2. The output of the filter and shaping circuit 24 is connected to sweep length control circuit 25 which may comprise a switch 38 and voltage divider 18. The output of the sweep length control 25 is applied to sweep amplifier 26. The amplifier 26 is preferably a direct current (D. C.) amplifier, the output of which is connected across the horizontal deflection plates 9 of the cathode ray indicator.

In operation, the cathode ray indicator 1 shows a pattern which is derived by coupling its vertical deflection plates 6 to the distributor breaker points. Therefore, the amplitude of the pattern is proportional to the electrical voltage appearing across the distributor breaker points. The horizontal or time component of the pattern is provided by the sweep circuits which have been discussed. One of the primary problems in the present invention is to provide an adequate stabilization of the length of the trace of the cathode ray tube, in view of the fact that the engine has a very large variation in speed of approximately a 10 to 1 ratio. The engine driven potentiometer 20 provides a trace having the same length regardless of engine speed. Conventional electronic cathode ray sweep circuits which are triggered once per cycle do not have automatic length stabilization and if employed would cause the length of the pattern to become larger or smaller as the engine speed varied. If proper stabilization of the sweep length were not provided, the pattern would become very small at high speeds so that the patterns would be difficult to read and the space of the cathode ray indicator face would not be fully utilized. It is not believed feasible to use a triggered electronic sweep generator for the speed range of as great as ten to one, which is the requirement in an automotive engine analyzer, since it would be costly and difficult to achieve. This is a primary reason for using the rotating potentiometer rather than conventional trigger sweep circuits.

The tachometer circuit 3, considered more specifically, comprises a sensing circuit 30 which measures the slope of the sawtooth wave derived from the potentiometer 20.

The slope of the sawtooth wave is a function of the engine speed and the output of the sensing circuit 30 which is proportional thereto is connected to the vacuum tube voltmeter 31. The meter 32 is responsive to the vacuum tube voltmeter input and is calibrated to provide a direct reading of engine speed (R. P. M.) in revolutions per minute. The tachometer has a very sensitive scale for tuning the engine to optimum performance. It reads peak speed as engine variables are changed.

The timing pulse generator circuit 4 comprises a pulse shaping and amplifier circuit 40 which differentiates and amplifies the sawtooth wave applied to it from the output of the filter circuit 24 to provide a timing pulse at the instant the sawtooth crosses zero voltage. The output of the pulse shaper and amplifier circuit 40 is connected to the vertical plates 6 of the cathode ray indicator 1. The same output is connected to the high voltage output stage 41, the output of which is connected to the timing light 5. The timing pulse generator operates to provide a timing pulse in the cathode ray indicator 1 in synchronism with the operation of the timing light 5. Therefore, as the timing light 5 illuminates the fly wheel in stroboscopic fashion, the time of the light flash is indicated on the cathode ray indicator where it may be used to measure basic timing and spark advance in connection with the ignition patterns, as will be more fully described.

Figure 2:
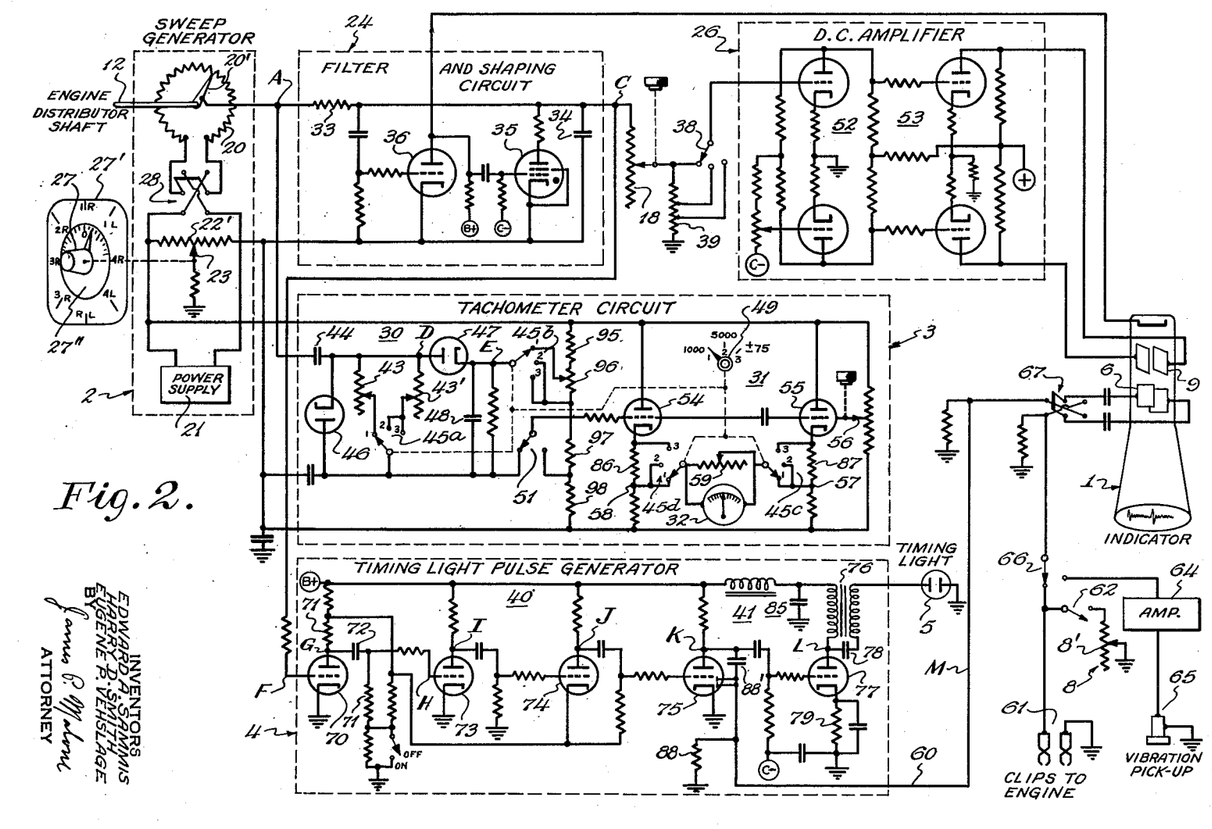
Fig. 2 is a schematic diagram of the embodiment of Fig. 1.

Fig. 2 illustrates a schematic diagram of the embodiment of Fig. 1. The sweep generator 2 comprises a rotating potentiometer 20, the movable arm 20' of which is driven by the engine distributor shaft 12. The potentiometer 22' is connected to a source of power 21 and also in parallel with the potentiometer 20; the potentiometer's variable top 23 is grounded through a resistance. The variable tap 23 is adapted to be adjusted by the cylinder selector knob 27 which indicates a particular cylinder on the indicator card 27'. The sweep voltage at point A is the voltage developed across the rotating potentiometer 20, plus a variable part of the selector or direct current (D. C.) level potentiometer 22', since the movable arm 23 of the potentiometer 22' is at ground potential. When the selector potentiometer arm 23 is at the midpoint, the sawtooth voltage will be centered about ground potential, and when it is shifted the sawtooth is shifted because of the change in direct current (D. C.) level. Therefore, when the knob 27 is moved, shifting the sawtooth voltage, the pattern from a particular cylinder may be centered on the cathode ray tube. A direct current (D. C.) source of voltage 21 is connected across the sweep generator potentiometer. The double pole, double throw reversing switch 28 is provided since some distributors rotate clockwise and some counterclockwise.

Figure 3:
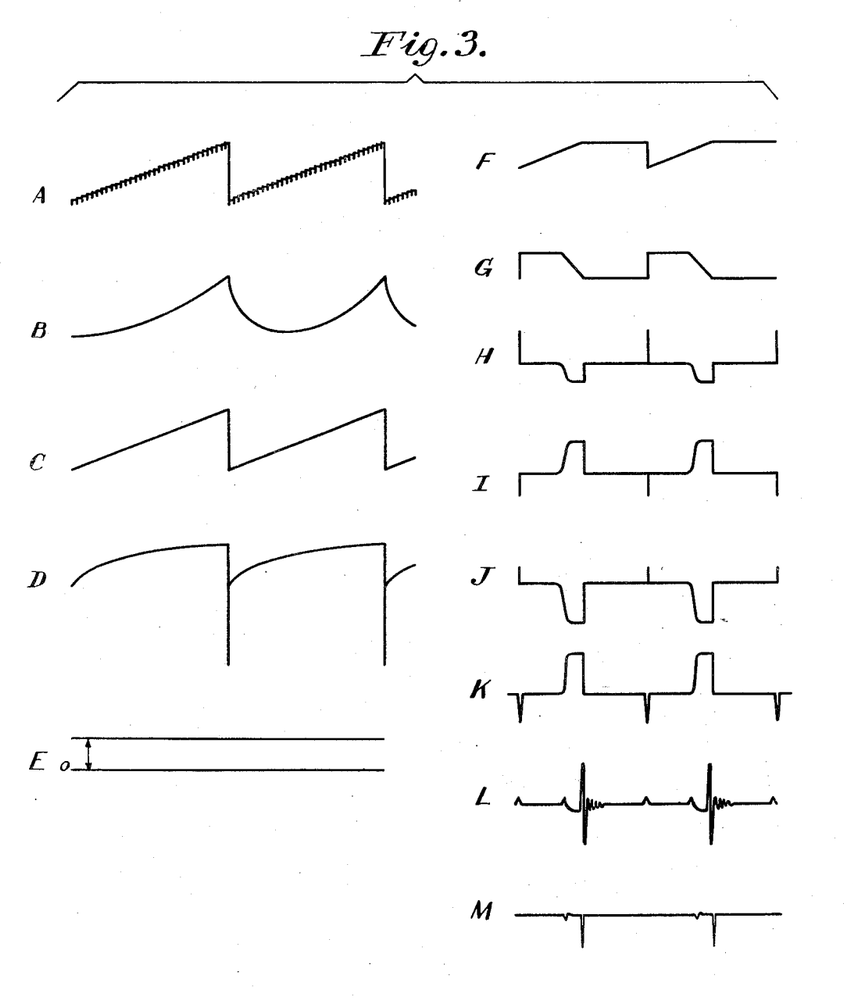
Fig. 3 is a group of waveforms illustrative of the operation of the embodiment of Fig. 2.

The sawtooth voltage developed by the sweep generator 2 appears at point A, as is shown in waveform A, Fig. 3. The waveform is rather rough due to the steps produced by the rotating arm 20' jumping from wire to wire of the potentiometer winding 20. The waveform at point A, Fig. 2, is smoothed out by the filter and shaping circuit 24. The filter comprises R. C. network resistor 33 and condenser 34 which have a time constant large enough to smooth the waveform. However, this large time constant would introduce an undesirable distortion, as shown in the waveform B, Fig. 3, which is especially objectionable because the retrace has a trailing edge which would interfere with the next sweep. In order to clip this retrace, the condenser 34 is discharged during the retrace period by the thyratron tube 35 which is triggered by the triode 36. This clips the retrace, as shown in waveform C of Fig. 3, which represents the signal at point C. The plate of the triode 36 is also connected to provide a blanking pulse to the cathode ray indicator 1 during the retrace.

The output of the filter and shaping circuit 24 at point C is applied to a potentiometer 18 which is the sweep length adjustment. The switch 38 also connects to the taps on a voltage divider 39 to provide predetermined sweep length control. The sweep length control circuits are adapted to change the sweep length from a relatively few crankshaft degrees to the full engine cycle so that either one selected cylinder pattern, or all the cylinder patterns, may be shown.

The output of the sweep length control circuits is connected to direct coupled amplifier 26 which contains two stages 52, 53 of conventional push-pull amplification. The output of the amplifier 26 is connected to the horizontal deflection plates 9 of the cathode ray indicator 1.

The input from the primary ignition coil, which is the voltage occurring across the breaker points, is connected by means of leads 61 through switch 66 and coupled to the vertical deflection plates 6 of the cathode ray indicator. The performance factor means 8 comprising a resistance 8' may be connected across the breaker points by switch 62. This provides means for arbitrarily lowering the potential applied to the spark plugs. By gradually lowering the potential, the plugs in poorest condition will stop firing and may be detected. Also the level at which engine speed drops off is a measure of general ignition condition. By using the performance rating means with a sensitive tachometer, we obtain a reference and thereby make readings reproducible.

The invention is not limited to showing merely the ignition patterns but any other indicium of performance such as vibrations may also be indicated by connecting the vibration pick-up 65 to the cathode ray indicator through amplifier 64 and switch 66. This will provide a pattern which may be used to identify various vibrations during the engine cycle, for instance detonation or knocking. The double pole, double throw switch 67 is provided to reverse the polarity of the various patterns, if desirable.

The cylinder selector knob 27 is indexed by short circuiting one spark plug, for instance, the number one spark plug, to obtain an easily identifiable pattern of that cylinder. The knob 27 is then turned relative to the card 27' so that the knob points to cylinder number one. The body of the rotating potentiometer 20 is then turned to center the shorted pattern. (This is preferably done with the expanded or fast sweep selected.) The card 27' must be numbered properly corresponding to the firing sequence of the particular engine and different cards are required for engines having a different number of cylinders or different firing sequences. For instance, one card will be required for six-cylinder engines and another card for eight-cylinder engines, and different cards are required for in-line and V-type engines. A very few cards will cover practically all automobiles of popular makes. The inner card 27'' having the degree marks is not connected to any other part but is free to rotate. It is used to accurately measure the number of degrees between any events displayed on the cathode ray tube.

The tachometer circuit 3 comprises a sensing circuit 30 which measures the slope of the sawtooth wave from the wiper arm 20' of the rotating potentiometer 20. The input sawtooth waves are connected to a differentiating circuit comprising resistors 43 or 43' and condenser 44. The time constant of the differentiating circuit may be changed by the switch 45a. The output of the differentiating circuit is the waveform D, Fig. 3, having sharp negative pulses. The sharp negative pulses of the waveform D are clipped by the shunt connected diode 46 and the remaining positive voltage pulses are conducted by the series connected diode 47 and smoothed by shunt condenser 48 to provide a direct current (D. C.) waveform E, Fig. 3, having a voltage level proportional to the engine speed. This direct voltage is fed to a vacuum tube voltmeter 31. The range selection switches 45a, 45b, 45c and 45d are ganged together and connected to a single knob 49.

The vacuum tube voltmeter comprises two triodes 54 and 55 having a direct current milliammeter 32 connected between their cathode circuits. The current through triode 55 is determined by the zero set potentiometer 56 so that a predetermined voltage appears at the connection of the meter 32 to its cathode resistor, for instance at point 57. Potentiometer 56 is used to set the pointer on zero on the 1000 and 5000 R. P. M. scales. The potentiometer 56 is connected across the power supply 21. The voltage to be measured is connected to the grid of the first triode 54 in series with the bias generated across bleeder circuit resistors 95, 96, 97, 98. Triode 54 will draw current proportionally to its grid voltage thereby establishing a corresponding voltage at the point 58 where the meter 32 is connected to its cathode circuit. The meter will pass current if there is any difference in voltage between the points, for instance 57 and 58, to which it is connected in the cathode circuits of the triodes 54 and 55 thereby providing a measure of the signal voltage applied to the grid of the triode 54.

In order to stabilize the absolute accuracy of the vacuum tube voltmeter primarily against vacuum tube instability, non-linearity and variations, degenerative feedback is inserted by means of the voltage drop across cathode resistors 86 and 87 on the 1000 and 5000 R. P. M. ranges. On the sensitive range the primary concern is not absolute accuracy but rather sensitivity.

Figure 4:
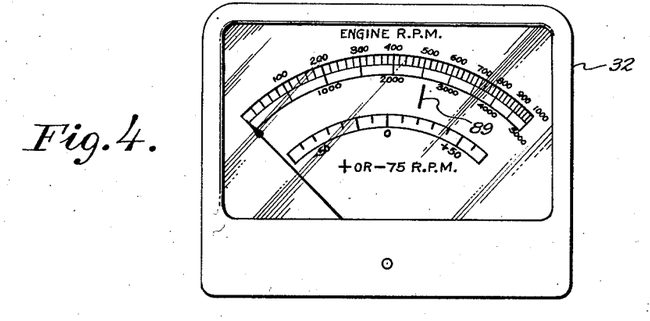
Fig. 4 is a view of the tachometer indicator.

The switch 51 connected to the grid of the triode 54 is the tachometer calibration switch and it provides a standard voltage to the vacuum tube voltmeter triode 54 so that the meter should have a predetermined reading shown by a calibration mark 89, Fig. 4. The sensitivity potentiometer 59 connected in parallel with the meter may then be adjusted to calibrate the meter. The potentiometer 96 functions to zero center the meter pointer on the sensitive scale, switch position III.

The range selector switch 45 position I provides a reading from 0 to 1000 revolutions per minute. The selector position II provides a reading from 0 to 5000 revolutions per minute, and the selector III position provides a reading of ±75 revolutions per minute, as is shown more fully in Fig. 4 which shows the scales on the meter face. The position No. III provides a very sensitive indication of revolutions per minute which is quite useful in obtaining accurate tuning of the automotive engine under test, particularly in the performance factor test, as will be more fully explained in connection with the operation of the system.

The timing light pulse generator 4 of Fig. 2 is adapted to provide synchronous timing pulses to the timing light 5 and the vertical deflection plates 6 of the cathode ray indicator at the time that the sweep voltage crosses zero. The timing light pulse generator receives the sawtooth voltage appearing across the sweep length control 18 which goes from negative through zero to positive. The timing light pulse generator generally comprises several stages of clipping and wave-shaping circuits which are adapted to provide the necessary waveforms F to M which are shown in Fig. 3. Their purpose is to obtain a sharp timing pulse where the sawtooth crosses zero and to clip and eliminate the pulse caused by the end of the sawtooth.

The sawtooth waveform C, Fig. 3, is applied to the grid of the triode 70. The positive portion of the sawtooth is clipped by the tube 70 as shown by waveform F on the grid since waveform C which is applied to the grid is positive with respect to the grounded cathode part of each cycle. The more negative portions of waveform C cut off triode 70 to produce voltage waveform G at its plate. Waveform G is differentiated by the circuit comprising condenser 72 and resistor 71 to provide the waveform H which is applied to the grid of triode 73. The triode 73 amplifies the waveform H and partially clips the positive portion thereof by drawing grid current, to provide the waveform I at its plate. The triode 74 performs a similar amplification and its bias is adjusted to clip the undesired pip at the end of the sawtooth by grid cutoff, to provide the waveform J at its plate.

The dual diode triode 75 provides the waveform K at its triode plate which is applied to the grid of triode 77 which is a driver tube. Waveform L appears on the plate of driver tube 77 as follows. The tube 77 is normally cut off and the positive leading edge of waveform K causes the tube 77 to conduct, drawing a high current from the primary of transformer 76. At the positive trailing edge of waveform K the transformer 76 causes damped oscillations producing the waveform L. Transformer 76 is connected like an autotransformer to provide high voltage step up. Condenser 78 prevents the B+ voltage from appearing at the output terminal. The cathode resistor 79 functions to prevent excessive current in tube 77 in the event of loss of fixed bias. The filter 85 functions to isolate the transformer 76 and driver tube 77 from the prior stages.

Resistor-capacitor network 88, 88' differentiates waveform K, the diodes of tube 75 clipping the positive portion to provide waveform M. This is the timing pip which is applied to the cathode ray indicator. The transformer 76 is a high voltage transformer which steps up the voltage pulse L which is applied to the timing light 5. Therefore, the timing light pulse generator provides two synchronous pulses, one to the timing light 5 and one to the cathode ray indicator so that the instant that the timing light 5 flashes is identified on the cathode ray indicator in true time and phase relation with the cylinder firing pattern. The small pips on waveform L are not sufficient to fire the timing light 5.

Figure 5:
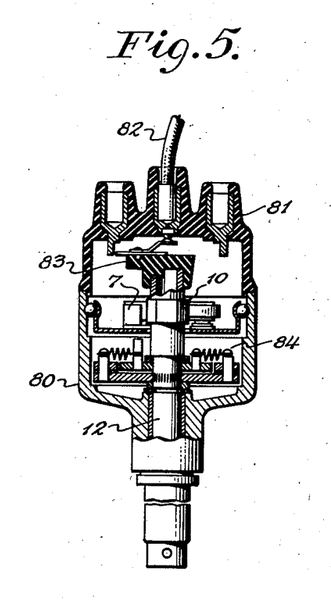
Fig. 5 is a view of an automotive distributor.

Fig. 5 illustrates a conventional automotive distributor comprising a shaft 12, a lower body member 80 and a removable cap 81. The cap 81 contains the terminals which are connected to the various spark plugs. The input spark is received over lead 82 from the coil 15 (Fig. 1). A rotor 83 is attached to the shaft 12 and rotates with the engine, distributing the spark to the various spark plug terminals on the cap 81. The weights 84 operate by centrifugal force in a conventional manner to advance the spark timing. The spark timing is also adapted to be advanced by vacuum pressure means which are not shown.

Figure 6:
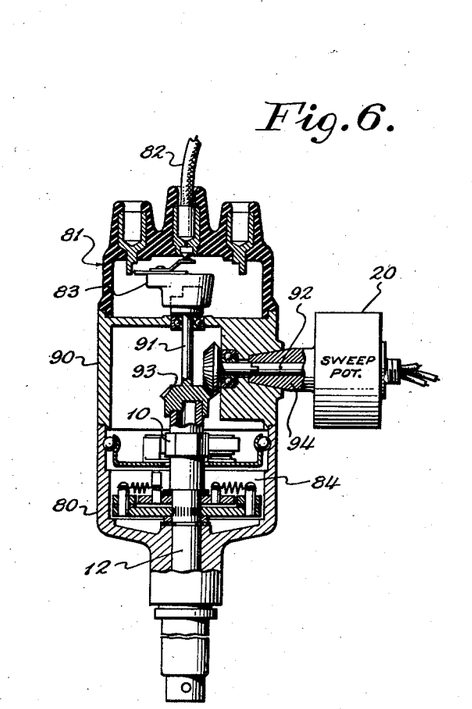
Fig. 6 is a view of an automotive distributor equipped with the adapter of the present invention.

Fig. 6 illustrates the conventional distributor of Fig. 5 fitted with the adapter 90 of the present invention. The adapter 90 comprises a body member which is adapted to fit between the lower body member 80 and the removable cap 81 of the distributor. The adapter 90 contains a shaft 91 which is adapted to operatively extend the shaft 12 of the distributor so that the operation of the distributor is not affected. The adapter also contains a horizontal shaft 92 which is connected to the vertical shaft 91 by means of the bevel gears 93. The horizontal shaft is connected to the rotating potentiometer 20, by means of connector 94. Therefore, the adapter 90 provides means for rotating the potentiometer 20 in direct synchronism with the engine cam shaft rotation. Several adapters are preferably provided to fit the several types of automobile distributors, but only one rotating potentiometer is required for the engine analyzer.

Figures 7, 7A:
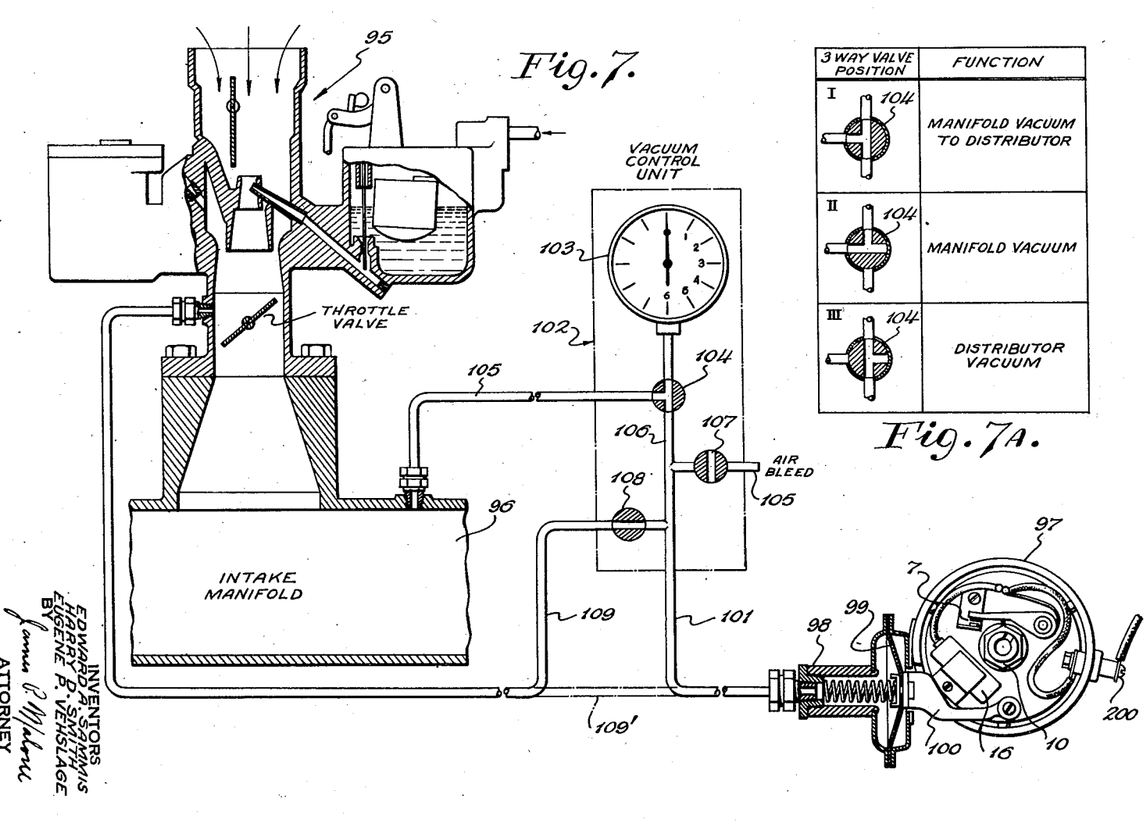
Fig. 7 is a schematic diagram of the vacuum control system of the present invention.
Fig. 7A is a chart showing the vacuum valve connections.

Fig. 7 shows the vacuum control means of the present invention. All modern automobiles are provided with a vacuum connection to the distributor so that the spark is retarded as a function of the load on the engine. The vacuum connection may be made to the intake manifold or to the carburetor side of the carburetor throttle valve. The present invention provides a vacuum gage for measuring the vacuum in the intake manifold and includes means for measuring and controlling the vacuum applied to the distributor in order to test the vacuum spark advance of the distributor.

Specifically, Fig. 7 shows a carburetor 95, the output of which is connected to the intake manifold 96. The distributor 97 has a conventional vacuum advancing device 98 comprising a spring loaded diaphragm 99 adapted to actuate the linkage 100 to rotate the breaker plate so as to retard the spark as a function of load. As load increases the vacuum decreases and the spring pushes diaphragm 99 out moving the linkage in the direction of shaft rotation thereby retarding the spark. The vacuum pressure for actuating the diaphragm is normally derived from the hollow tube 109' which is connected to the carburetor side of the carburetor throttle valve.

The vacuum control unit 102 of the present invention comprises a conventional vacuum gage 103 which is connected to a three-way valve 104 having two other input connections. One of the other connections 105 is connected to the intake manifold 96. The other connection 106 is connected to atmospheric pressure through shut off valve 107 and to the carburetor side of the throttle valve 108 through the tube 109.

Fig. 7A shows the three valve positions of valve 104 and the function of each. When the valve is in position I, manifold vacuum is applied to the distributor and the gage 103 measures that vacuum. In position II the gage measures the manifold vacuum, and in position III the gage measures the distributor vacuum.

When connecting the vacuum control unit 102 to the engine, the original dotted line connection 109' from the carburetor throttle valve to the distributor is disconnected and reconnected to the vacuum control unit as shown. Secondly, the hollow tube 105 is connected from the three-way valve 104 to the intake manifold. This connection may be made to the conventional windshield wiper connection point, if the windshield wiper is connected directly to the manifold.

The operational use of the vacuum control unit is as follows. When the valve 104 is in position I, the gage will measure the manifold vacuum applied to the distributor. This can be used to indicate whether the vacuum advance unit of the distributor is functioning properly.

When the three-way valve 104 is in position II, it measures the manifold vacuum and can be utilized as a conventional vacuum gage, the use of which is well known in the art.

The shut-off valve 108 may be used to shut off the vacuum input to the distributor when it is desired to isolate and test the centrifugal spark advance. The shut-off valve 107 provides means for connecting atmospheric pressure to the distributor vacuum advance unit for test purposes. The amount of vacuum applied to the distributor may be varied by adjusting the openings of valves 107 and 104.

Figure 8:
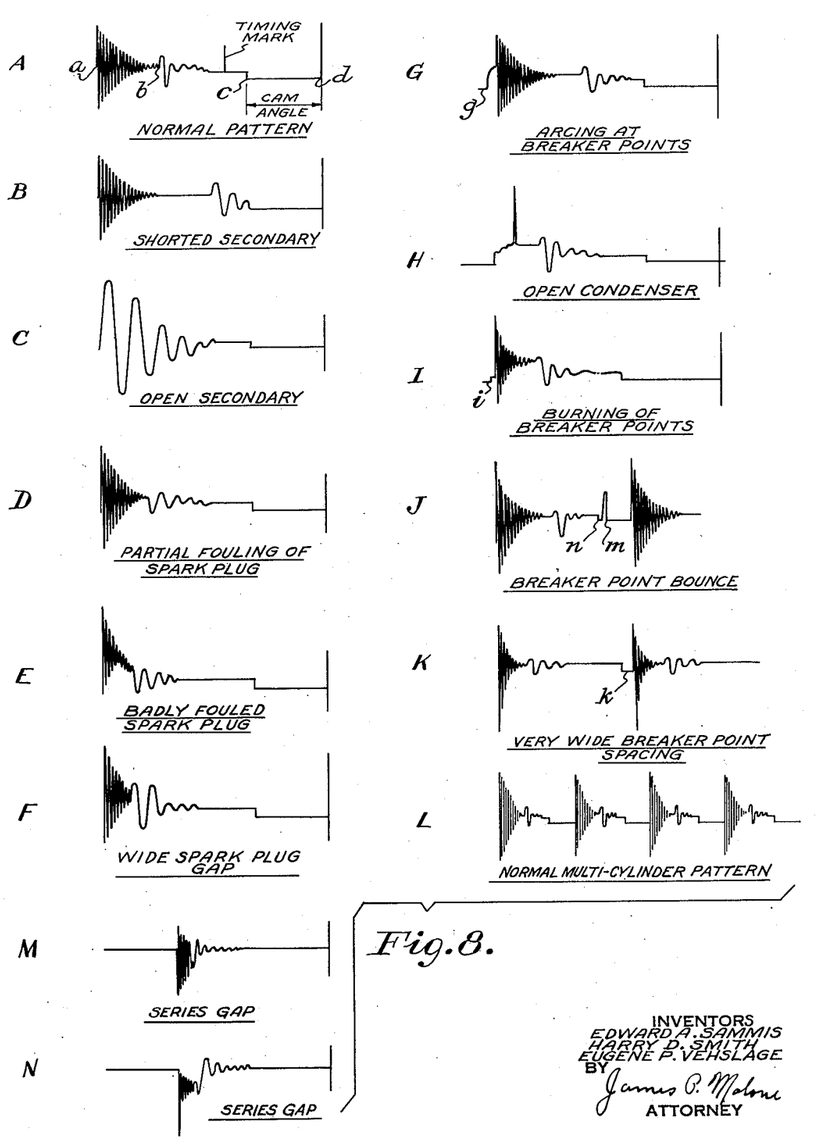
Fig. 8 is a group of cathode ray patterns illustrative of various faults detected by the invention.

Fig. 8 illustrates various patterns illustrative of typical faults occurring in the ignition system. Pattern A shows a normal firing pattern. The breaker points open and the spark plug fires at the point *a* and the spark continues until the point *b* as shown by the high frequency oscillations occurring from points *a* to *b*. The low frequency waves starting at points *b* are due to the inductance in the primary circuit. The breaker points close at the points *c* as is clearly shown on the pattern and remain closed until the next cylinder is fired at the point *d*. The interval from *c* to *d* is the cam angle.

Pattern B shows a shorted secondary pattern in which the low frequency components are moved to the right relative to their position as shown in the normal pattern A.

Pattern C shows an open secondary pattern. The plug does not fire.

Pattern D shows a partial fouling of a spark plug.

Pattern E shows a badly fouled spark plug when the firing is sharply curtailed.

Pattern F is caused by the spark plug having too wide a gap.

Pattern G shows arcing at the breaker points. The arcing occurs at the point *g* and delays the firing of the spark plug.

Pattern H shows an open condenser. Note the severe arcing.

Pattern I shows burning of the breaker points at point *i*.

Pattern J shows breaker point bounce illustrated by the voltage rise at point *m* caused as the points bounce apart after being closed at the point *n*.

Pattern K shows very wide breaker point spacing which results in the very small cam angle as shown at *k*.

Pattern L shows a normal multi-cylinder pattern.

Patterns M and N show series gap patterns which might be caused, for instance, by a wire pulling away from a terminal.

TYPICAL ENGINE ANALYZER OPERATION PROCEDURE

A. Hook-up

1. Install distributor adapter 90, as shown in Fig. 6.
2. Clip signal leads 61, Fig. 2, to breaker points, terminal 200, Fig. 7, and ground.
3. Connect vacuum lines to distributor, carburetor, and manifold, as shown in Fig. 7.

B. Operation

1. Run engine at any convenient speed (for instance 1200 R. P. M.). Orient No. 1 engine cylinder with No. 1 position on dial 27' by using shorted secondary pattern, as follows:
    a. Ground spark plug No. 1 with a clip lead.
    b. Select expanded sweep (single cylinder pattern).
    c. Set cylinder selector knob 27 on cylinder No. 1 on card 27'.
    d. Rotate body of rotating potentiometer 20 relative to adapter 90 to center shorted pattern.
2. Run engine at 1200 R. P. M. (or any convenient speed) and examine ignition patterns; compare with standard patterns, Fig. 8, if not familiar with pattern. Select cylinders with selector knob 27. Check for:
    a. Spark plug operation: shorts, fouls, opens, wide gaps, series gaps.
    b. Breaker point operation: arcing, bouncing, burning, gap spacing.
3. Measure "performance factor." (Reproducibility of reading with sensitive tachometer 3 is used for reliably indicating drop in speed.)
    a. Zero center tachometer 3 on sensitive scale.
    b. Connect "performance factor" circuit 8 with switch 62.
    c. Put full resistance in circuit (0 position) and vary potentiometer 8' to decrease resistance across points, thereby lowering spark intensity. Worst plugs having wide gaps and fouled contacts will stop firing first. Performance rating figure where speed drops off sharply is an indication of general ignition performance, and may be compared with a standard figure. Average readings are from 60–80. Any reading below 60 (above 25 ohms) indicates trouble.

At a given speed between 1000 and 2000 R. P. M. the value of resistance at which the engine speed drops 50 R. P. M. is an indication of general ignition condition. The value of resistance at which an engine speed drops 50 R. P. M. varies with different engines, but if this value is known for a given engine in perfect operating condition, then if a similar engine drops off at any higher value of resistance, it is a sure indication of trouble in the ignition system. This method provides a good way of determining plug condition in lieu of putting a load on the engine.

4. To measure engine timing:
    1. Set the timing light 5 so that it illuminates ignition timing marks, for instance on the fly wheel.
    2. Turn the cylinder selector knob 27 until the light 5 stroboscopically illuminates the timing mark on the crankshaft in proper register with the reference mark provided by the manufacturer.

The timing pip on the indicator (see pattern A), Fig. 8, should now line up with the left edge of the voltage amplitude firing pattern of the cylinder which the manufacturer uses for timing. If the timing pip is to the left of the voltage pattern, the firing is retarded with respect to the designed timing point. The amount retarded in degrees may then be accurately measured as follows:

1. Accurately set the vernier card 27", Fig. 2, so that 0 is opposite the pointer of knob 27.
2. Turn knob 27 to line up the timing pip with the left edge of the voltage pattern.
3. Read the amount retarded in degrees on the vernier scale 27" opposite the knob pointer.

5. Calibrate distributor:
   1. Check vacuum advance against automobile manufacturers' specifications by changing diaphragm pressure at constant speed. Measure start of advance and maximum advance as a function of diaphragm pressure.
      a. Shut off valve 108,
      b. Open valve 107,
      c. Turn three-way valve to position I,
      d. Vary valve 107 and three-way valve to vary vacuum pressure. A typical advance starts at a vacuum of 5–7 inches of mercury and is advanced 8 degrees at 15–17 inches. Measure vacuum on gage 103. Measure advance as previously described.
   2. Check centrifugal advances. Apply atmospheric pressure to diaphragm to disable vacuum advance, and measure spark advance as a function of engine speed.
      a. Turn valve 108 off,
      b. Turn valve 107 on,
      c. Turn three-way valve to position III. Measure advance at several speeds and compare with manufacturing specifications. A tolerance of ±2° is allowable.

6. Measurement of cam angle:

The cam angle or dwell is the number of degrees that the breaker points remain closed between any two cam lobes.
   1. Turn knob 27 to select cylinder pattern.
   2. Turn knob 27 to put timing pip at breaker point closing (point c of pattern A, Fig. 8).
   3. Zero the degree card 27".
   4. Move knob 27 to move the next pattern over to the timing pip. The number of degrees of cam angle may be read from the degree card 27".

7. Power timing:

The object of the power timing is to provide an artificial load by running the engine on two cylinders and then manually rotating the distributor for maximum speed.
   1. Short all cylinders except two which fire at equal intervals.
   2. Run the engine at 1800 to 2000 R. P. M.
   3. Switch tachometer 3 to senitive range with switch 45 and zero it with potentiometer 96.
   4. Unclamp and rotate the distributor manually for maximum speed on tachometer.

The sensitivity of the tachometer provides means for very accurately timing the engine under load conditions.

To conclude, it is seen that the present invention provides integrated instrumentation which is adapted to be quickly and easily connected to an automotive engine. It provides means for completely and systematically dynamically testing the ignition system for all usual malfunctions. The use of the present invention eliminates the manpower and material waste in the aimless hit-or-miss testing, removing and replacing of parts which are common in the conventional cut-and-try method of servicing automobiles. By means of the present invention, the ignition system of an automobile may be completely checked without removing any parts by making a few simple connections and following a detailed check list. The net result is that the ignition system is given a complete and systematic operational check in a very short time. The invention may be operated by the average mechanic and will greatly increase his capabilities. The invention provides means for completely reorganizing and improving methods of testing automobile ignition systems and eliminates waste of manpower and parts which are necessary evils of the present unsystematic cut-and-try methods of testing.

The invention is not limited to use in detecting ignition malfunctions, but may be used with vibration or pressure pick-ups attached to the engine block to detect undesired knocking or detonation.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

1. An analyzer for an automotive engine comprising a cathode ray tube having horizontal and vertical deflecting means, said vertical deflecting means being connected to the ignition system of said engine, a sweep voltage generator connected to said horizontal deflecting means of said cathode ray tube including a rotating potentiometer connected to said engine, a tachometer circuit connected to the output of said rotating potentiometer including means to measure the slope of said sweep generator output, a timing pulse generator connected to and adapted to be triggered from the output of said sweep generator means, one output of said pulse generator being connected to said vertical deflection means of said cathode ray tube, and a timing light connected to said timing pulse generator whereby a timing marker pulse is provided on said cathode ray in coincidence with the flashing of said timing light.

2. An analyzer for an internal combustion engine comprising a cathode ray tube having deflecting means, one of said deflecting means being connected to the ignition system of said engine, a sweep voltage generator connected to one of said deflecting means of said cathode ray tube including a rotating potentiometer, cylinder selector means connected to said rotating potentiometer, a tachometer circuit connected to the output of said rotating potentiometer including means to measure the slope of said sweep generator output, a timing pulse generator connected and adapted to be triggered from the output of said sweep generator means, one output of said pulse generator being connected to one of said deflection means of said cathode ray tube, and a timing light connected to said timing pulse generator whereby a timing marker pulse is provided on said cathode ray in coincidence with the flashing of said timing light.

3. An analyzer for an automotive engine comprising a cathode ray tube having horizontal and vertical deflecting means, said vertical deflecting means being connected to the ignition system of said engine, sweep voltage generator means, means to connect said sweep voltage generator to said engine comprising an adapter designed to fit the distributor of said engine, a rotating potentiometer connected to said adapter, a tachometer circuit connected to the output of said rotating potentiometer including means to measure the slope of said sweep generator output, a timing pulse generator connected and adapted to be triggered from the output of said sweep generator means, one output of said pulse generator being connected to said vertical deflection means of said cathode ray tube, and a timing light connected to said timing pulse generator whereby a timing marker pulse is provided on said cathode ray in coincidence with the flashing of said timing light.

4. In an analyzer for an internal combustion engine, having an ignition system and a distributor with a body and a removable cap, a cathode ray tube having horizontal and vertical deflecting means, said vertical deflecting means being adapted for connection with the ignition system of said engine, sweep voltage generator means the output of which is connected with said horizontal deflecting means, a potentiometer with a rotating tap connected to control said sweep voltage generator means, means for rotating said tap comprising an adapter arranged to removably fit between the body and cap of said distributor.

5. In an analyzer for an automotive engine comprising a cathode ray tube having horizontal and vertical deflecting means, said vertical deflecting means being connected to the ignition system and said engine, variable phase sweep voltage generator means, means to connect said sweep voltage generator to said engine comprising an adapter designed to fit the distributor of said engine, a rotating potentiometer connected to said adapter, and tachometer means connected to the output of said rotating potentiometer including means to measure the slope of saw tooth sweep voltage.

6. An analyzer for an automotive engine comprising a cathode ray tube having sweep generator means, said vertical deflecting means being connected to the ignition system of said engine, means to connect said sweep generator to said engine comprising an adapter connected to said engine distributor, said sweep generator means including a rotating potentiometer connected to said adapter, a timing pulse generator connected to the output of said sweep voltage means, one output of said timing pulse generator being connected to said vertical deflecting means of said cathode ray tube, and a timing light connected to said timing pulse generator.

7. An analyzer for an automotive engine comprising a cathode ray tube having variable phase sweep generator means, said vertical deflecting means being connected to the ignition system of said engine, means to connect said sweep generator to said engine comprising an adapter connected to said engine distributor, said sweep generator means including a rotating potentiometer connected to said adapter, a timing pulse generator connected to the output of said sweep voltage means, one output of said timing pulse generator being connected to said vertical deflecting means of said cathode ray tube, a timing light connected to another output of said timing pulse generator, vacuum pressure switching means connected to said engine and to said distributor to control the vacuum pressure applied to said distributor, and a vacuum gage connected to said vacuum switching means.

8. Means to check automobile spark plugs dynamically without removing them from the engine comprising a cathode ray tube having horizontal and vertical deflecting means, a sweep voltage generator connected to provide a sweep voltage to said cathode ray tube, said generator means comprising a rotating potentiometer mechanically connected to said engine, and cylinder selector means connected to said rotating potentiometer.

9. Means to measure the timing error of an internal combustion engine comprising a cathode ray tube having horizontal and vertical deflecting means, a sweep voltage generator connected to the said horizontal deflecting means comprising an adapter connected to said engine distributor and a rotating potentiometer connected to said adapter, a timing light pulse generator connected to the output of said sweep generator means, the output of said pulse generator being connected to said vertical deflecting means, a timing light connected to said timing pulse generator, said timing light being used to illuminate said engine fly wheel whereby the timing error may be read directly on said cathode ray indicator.

10. In an analyzer for an automotive engine comprising a cathode ray tube having horizontal and vertical deflecting means, said vertical deflecting means being connected to the ignition system of said engine; means to measure cam angle of automobile breaker points comprising a variable phase sweep generator connected to said horizontal deflecting means, a rotating potentiometer connected to said engine and a timing pulse generator connected and adapted to put a timing pulse on said indicator, whereby the cam angle of the engine breaker points may be determined from said cathode ray tube pattern by moving the timing pulse a measurable amount from the beginning to the end of said cam angle portion of said pattern.

11. In an analyzer for an automotive engine comprising a cathode ray tube having horizontal and vertical deflecting means, said vertical deflecting means being connected to the ignition breaker points of said engine; means to measure automobile spark advance comprising a sweep voltage generator connected to said cathode ray tube and including a rotating potentiometer connected to said engine distributor, means connected to said engine to measure vacuum pressure and means connected to control said vacuum pressure.

12. In an engine analyzer for an internal combustion engine, a sweep voltage generator means comprising a rotating potentiometer, a low pass filter connected to the output of said rotating potentiometer including a shunt connected condenser, and a switch tube connected and adapted to discharge said condenser at the end of said sweep voltage to clip the trailing edge of the sweep voltage caused by said filter.

13. In an engine analyzer for an internal combustion engine, a sweep voltage generator means comprising a rotating potentiometer connected to produce a sawtooth voltage, a low pass filter connected to the output of said rotating potentiometer including a shunt connected condenser, a switch tube connected and adapted to discharge said condenser at the end of said sawtooth voltage, and a second potentiometer connected in parallel with said rotating potentiometer, the arm of said second potentiometer being adjustable to thereby provide means for shifting said sawtooth voltage by moving said arm.

14. An analyzer for an internal combustion engine comprising a cathode ray tube connected to the ignition system of said engine, a sweep voltage generator connected to said cathode ray tube including a rotating potentiometer connected to said engine, a tachometer circuit connected to the output of said rotating potentiometer including means to measure the slope of said sweep generator output, a timing pulse generator connected and adapted to be triggered from the output of said sweep generator means, one output of said pulse generator being connected to said vertical deflection means of said cathode ray tube, and a timing light connected to said timing pulse geenrator whereby a timing marker pulse is provided on said cathode ray in coincidence with the flashing of said timing light.

15. An analyzer for an internal combustion engine comprising a cathode ray indicator connected to the ignition system of said engine, a sweep voltage generator connected to said engine and to said cathode ray indicator for providing a sweep voltage thereto, and an electronic tachometer including a differentiating circuit connected to the output of said sweep voltage generator to indicate the speed of said engine.

16. An analyzer for an internal combustion engine comprising a cathode ray indicator connected to the ignition system of said engine, a sweep voltage generator connected to said engine and to said cathode ray indicator for providing a sweep voltage thereto, an electronic tachometer connected to the output of said sweep voltage generator to indicate the speed of said engine, and a timing light with a timing pulse generator connected to the output of said sweep voltage generator and connected and adapted to energize said timing light and said cathode ray indicator.

17. An analyzer for an internal combustion engine comprising a cathode ray indicator connected to the ignition system of said engine, a sweep voltage generator connected to said engine and to said cathode ray indicator for providing a sweep voltage thereto, an electronic tachometer connected to the output of said sweep voltage generator to indicate the speed of said engine, a timing light with a timing pulse generator connected to the output of said sweep voltage generator and connected and adapted to energize said timing light and said cathode ray indicator, and vacuum pressure means connected and adapted to measure and control the vacuum to the distributor of said engine.

18. In an engine analyzer for an internal combustion engine, a sweep voltage generator comprising a rotating potentiometer connected to produce a sawtooth wave, a second potentiometer connected in parallel with said first rotating potentiometer and having its wiper arm movable to vary the direct current level of said sawtooth wave generated by said rotating potentiometer, a filter circuit connected between the arm of said rotating potentiometer and ground to produce a modified version of said sawtooth wave, and a restorer circuit connected to the output of said filter circuit and adapted to clip the retrace of said modified version of said sawtooth wave.

19. In an engine analyzer for an internal combustion engine, a sweep voltage generator comprising a rotating potentiometer connected to produce a sawtooth voltage, a second potentiometer connected in parallel with said first rotating potentiometer and having its wiper arm movable to thereby vary the direct current level of the sawtooth voltage generated by said rotating potentiometer, a filter circuit connected between the arm of said rotating potentiometer and ground said filter circuit producing a modified version of said sawtooth voltage, a restorer circuit connected to the output of said filter circuit and adapted to clip the retrace of said modified version of said sawtooth voltage, and means connected to the output of said restorer circuit for varying the amplitude of said modified version of said sawtooth voltage.

20. In an engine analyzer, a cathode ray indicator, a sweep voltage generator connected to said engine to provide a sweep voltage to said cathode ray indicator, a timing light for timing said engine by illuminating the fly wheel, and a timing pulse generator connected to the output of said sweep voltage generator comprising means to differentiate said sweep voltage to provide a timing pulse, and means to apply said timing pulse to said cathode ray indicator and to said timing light in synchronism.

21. An analyzer for an automotive engine having a distributor with a body and a removable cap, comprising a vibration pickup attached to said engine, a cathode ray tube having horizontal and vertical deflecting means, said vertical deflecting means being connected to said vibration pickup, sweep voltage generator means the output of which is connected to said horizontal deflecting means, a potentiometer with a rotating tap connected to control said sweep voltage generator means, means for rotating said tap comprising an adapter arranged to removably fit between the body and cap of said distributor.

22. An analyzer for an automotive engine comprising signal pickup means, a cathode ray tube having horizontal and vertical deflecting means, said vertical deflecting means being connected to said signal pickup means, sweep voltage generator means, means to connect said sweep voltage generator to said engine comprising an adapter designed to fit the distributor of said engine, a rotating potentiometer connected to said adapter, tachometer means connected to the output of said rotating potentiometer including means to differentiate the slope of saw tooth sweep voltage.

23. An analyzer for an internal combustion engine comprising a cathode ray tube having horizontal and vertical deflection means, said vertical deflection means being adapted to receive signals occurring during operation of said engine, a sweep waveform generator including a source of potential, a first potentiometer connected across said source and including means for mechanically connecting the tap thereof to be driven by said engine, a second potentiometer connected across said source and having an adjustable ground tap, and means connected to be controlled by the output of said sweep generator and by the potential at said adjustable ground tap and having its output connected to said horizontal deflection means, the response of said means being limited to a comparatively narrow range of said sweep generator output embracing the potential of said engine-driven tap, whereby a constant portion of said signals is visually displayed on said cathode ray tube for all engine speeds and desired signals occurring in an engine cycle are selected by adjustment of said second potentiometer tap.

24. Means to check the operation of an automobile engine comprising a cathode ray tube having horizontal and vertical deflection means, said vertical deflection means being adapted to receive signals occurring during operation of said engine, a sweep waveform generator connected to control the horizontal sweep of said cathode ray beam, said generator means comprising a potentiometer having a tap and means mechanically connecting said tap in driven relation to said engine, and means for selecting a desired fractional portion of the signals occurring in an engine cycle for display on said cathode ray tube.

References Cited in the file of this patent

UNITED STATES PATENTS

| | | |
|---|---|---|
| 1,537,538 | Lober | May 12, 1925 |
| 1,537,670 | Hammond | May 12, 1925 |
| 2,190,713 | Hintze et al. | Feb. 20, 1940 |
| 2,256,601 | West | Sept. 23, 1941 |
| 2,282,340 | Pieplow | May 12, 1942 |
| 2,339,743 | Norman | Jan. 18, 1944 |
| 2,355,363 | Christaldi | Aug. 8, 1944 |
| 2,426,208 | Hardy | Aug. 26, 1947 |
| 2,518,427 | Lindberg et al. | Aug. 8, 1950 |
| 2,575,494 | Hornfeck | Nov. 20, 1951 |
| 2,622,441 | Richardson et al. | Dec. 23, 1952 |

FOREIGN PATENTS

| | | |
|---|---|---|
| 156,352 | Australia | Dec. 11, 1952 |